(12) United States Patent
Koetting et al.

(10) Patent No.: US 7,563,137 B1
(45) Date of Patent: Jul. 21, 2009

(54) MECHANICAL FASTENER FOR COUPLING TO ELECTRICAL TERMINALS OF BATTERY MODULES AND METHOD FOR COUPLING TO ELECTRICAL TERMINALS

(75) Inventors: William Koetting, Davisburg, MI (US); Kwok Tom, Madison Heights, MI (US); Peter T. Morris, Novi, MI (US)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/164,843

(22) Filed: Jun. 30, 2008

(51) Int. Cl.
*H01R 24/00* (2006.01)
(52) U.S. Cl. .................. 439/627; 439/500; 429/158
(58) Field of Classification Search .............. 439/627, 439/500, 510; 429/158, 160
See application file for complete search history.

(56) References Cited

U.S. PATENT DOCUMENTS

| | | | | |
|---|---|---|---|---|
| 7,270,576 | B2 * | 9/2007 | Kim et al. | 439/627 |
| 2004/0043663 | A1 * | 3/2004 | Ikeda et al. | 439/627 |
| 2006/0194101 | A1 * | 8/2006 | Ha et al. | 429/158 |
| 2006/0234558 | A1 * | 10/2006 | Li | 439/627 |

* cited by examiner

*Primary Examiner*—Hien Vu
(74) *Attorney, Agent, or Firm*—Cantor Colburn LLP (57) ABSTRACT

A mechanical fastener for coupling to electrical terminals of battery modules and a method for coupling to the electrical terminals are provided. The mechanical fastener includes a trapezoidal-shaped plate and a cover portion. The cover portion is disposed over the trapezoidal-shaped plate and is urged toward the trapezoidal-shaped plate to couple to electrical terminals from battery modules disposed between the trapezoidal-shaped plate and the cover portion.

5 Claims, 7 Drawing Sheets

MECHANICAL FASTENER FOR COUPLING TO ELECTRICAL TERMINALS OF BATTERY MODULES AND METHOD FOR COUPLING TO ELECTRICAL TERMINALS

TECHNICAL FIELD

This application relates generally to a mechanical fastener for coupling to electrical terminals of battery modules and a method for coupling to the electrical terminals.

BACKGROUND OF THE INVENTION

Battery packs generally have a plurality of battery cells. Each battery cell further has electrodes that are coupled through fasteners to electrodes of other battery cells. However, the fasteners are relatively difficult to install during a manufacturing process.

Accordingly, the inventors herein have recognized a need for an improved mechanical fastener that minimizes and/or eliminates the above-mentioned deficiency.

SUMMARY OF THE INVENTION

A mechanical fastener for coupling to electrical terminals of battery modules in accordance with an exemplary embodiment is provided. The mechanical fastener includes a trapezoidal-shaped plate having a top surface, a bottom surface, and first and second side surfaces. The first and second side surfaces extend between the top surface and the bottom surface. The trapezoidal-shaped plate has a first aperture extending from the top surface into the trapezoidal-shaped plate. The first aperture defines a first threaded region. The mechanical fastener further includes a cover portion having a first plate and first and second leg portions. The first and second leg portions are disposed on opposite ends of the first plate and integral with the first plate. The first and second leg portions extend outwardly from the first plate. The first plate has a second aperture extending therethrough. A bottom surface of the first plate is received on the top surface of the trapezoidal-shaped plate. The mechanical fastener further includes a first coupling member configured to extend through the first and second apertures and to engage the first threaded region to urge the cover portion toward the trapezoidal-shaped plate such that first and second electrical terminals disposed adjacent to the first and second side surfaces, respectively, of the trapezoidal-shaped plate are secured between the first and second side surfaces, respectively, and the first and second leg portions, respectively, of the cover portion.

A method for coupling to electrical terminals of battery modules utilizing a mechanical fastener in accordance with another exemplary embodiment is provided. The mechanical fastener has a trapezoidal-shaped plate and a cover portion. The trapezoidal-shaped plate has a first aperture and the cover portion has a second aperture. The method includes disposing the trapezoidal-shaped plate adjacent first and second electrical terminals, such that the first and second electrical terminals are disposed on opposite angled surfaces of the trapezoidal-shaped plate. The method further includes disposing the cover portion over a portion of the trapezoidal-shaped plate such that the first and second electrical terminals are disposed between the cover portion and the opposite angled surfaces of the trapezoidal-shaped plate. The method further includes disposing a coupling member through the first and second apertures to move the trapezoidal-shaped plate toward the cover portion to secure the first and second electrical terminals between the trapezoidal-shaped plate and the cover portion.

DETAILED DESCRIPTION OF AN EXEMPLARY EMBODIMENT

Figure 1:
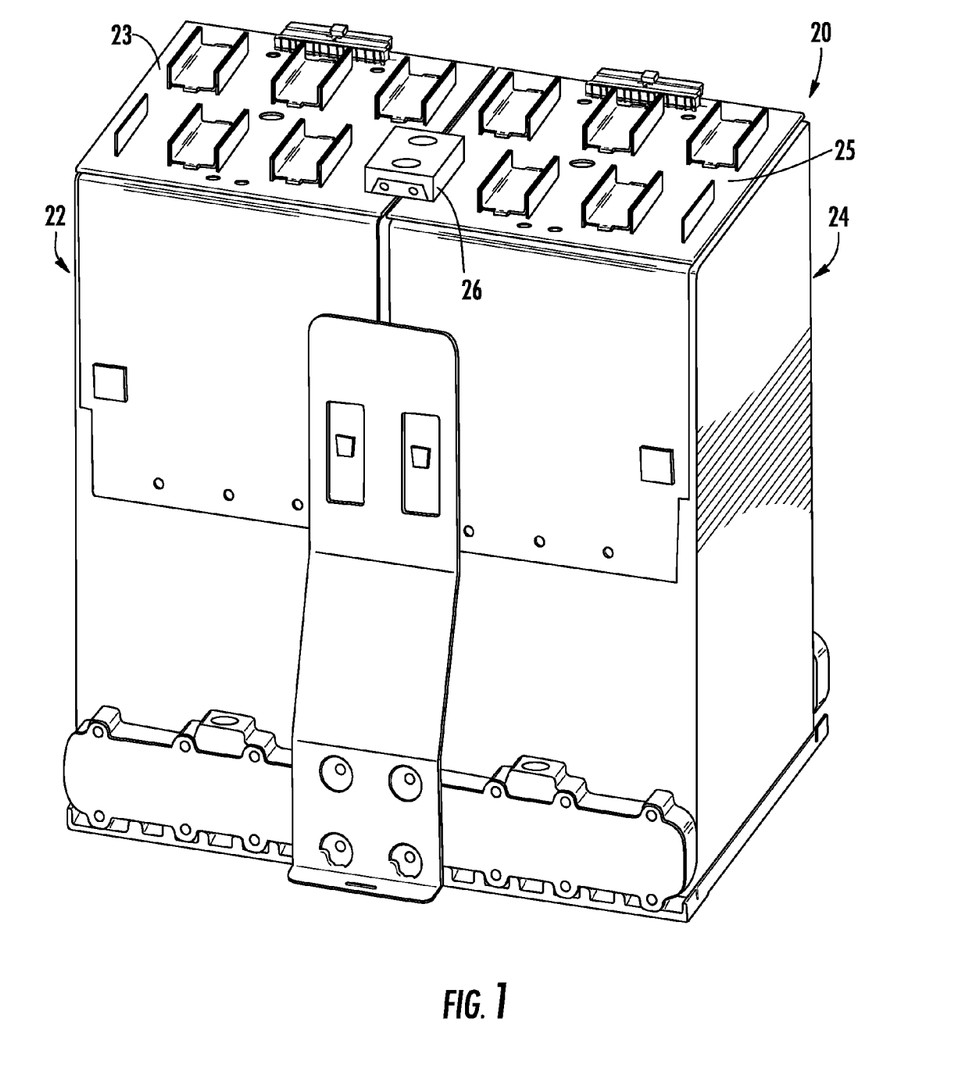
FIG. 1 is a schematic of a battery assembly having first and second battery modules in accordance with an exemplary embodiment.
Figure 2:
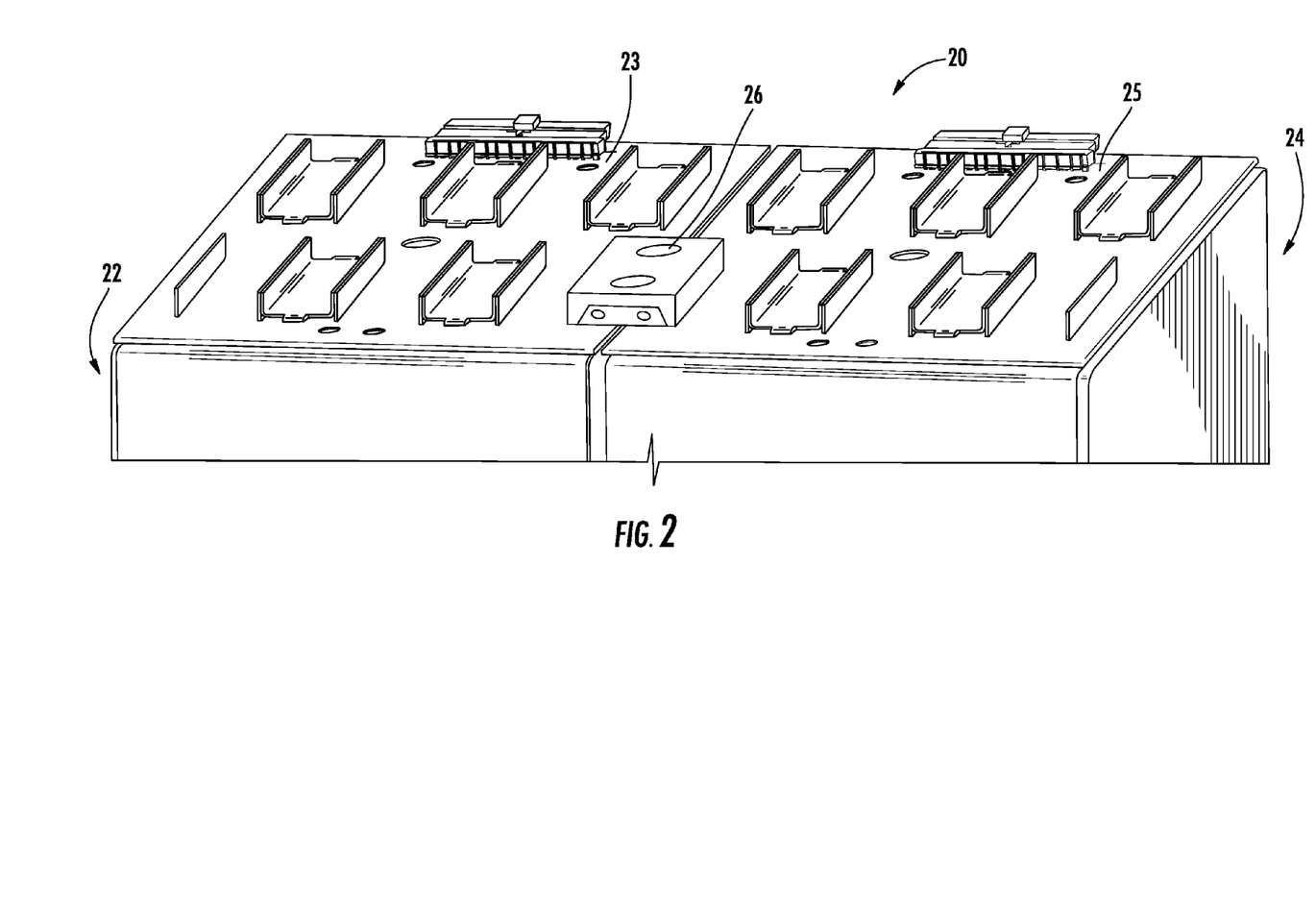
FIG. 2 is an enlarged schematic of a portion of the battery assembly of FIG. 1.

Referring to FIGS. 1 and 2, a battery assembly 20 for providing electrical power in accordance with an exemplary embodiment is illustrated. The battery assembly 20 includes a battery module 22, an interconnect assembly 23, a battery module 24, an interconnect assembly 25, and a mechanical fastener 26. An advantage of the mechanical fastener 26 is that the fastener 26 can physically couple to both an electrical terminal from the battery module 22 and to an electrical terminal of the battery module 24 to electrically couple the electrical terminals together. For purposes of understanding, a battery cell assembly has at least a housing and a battery cell therein. A battery module has a plurality of battery cell assemblies therein electrically coupled together in a desired configuration.

Figure 3:
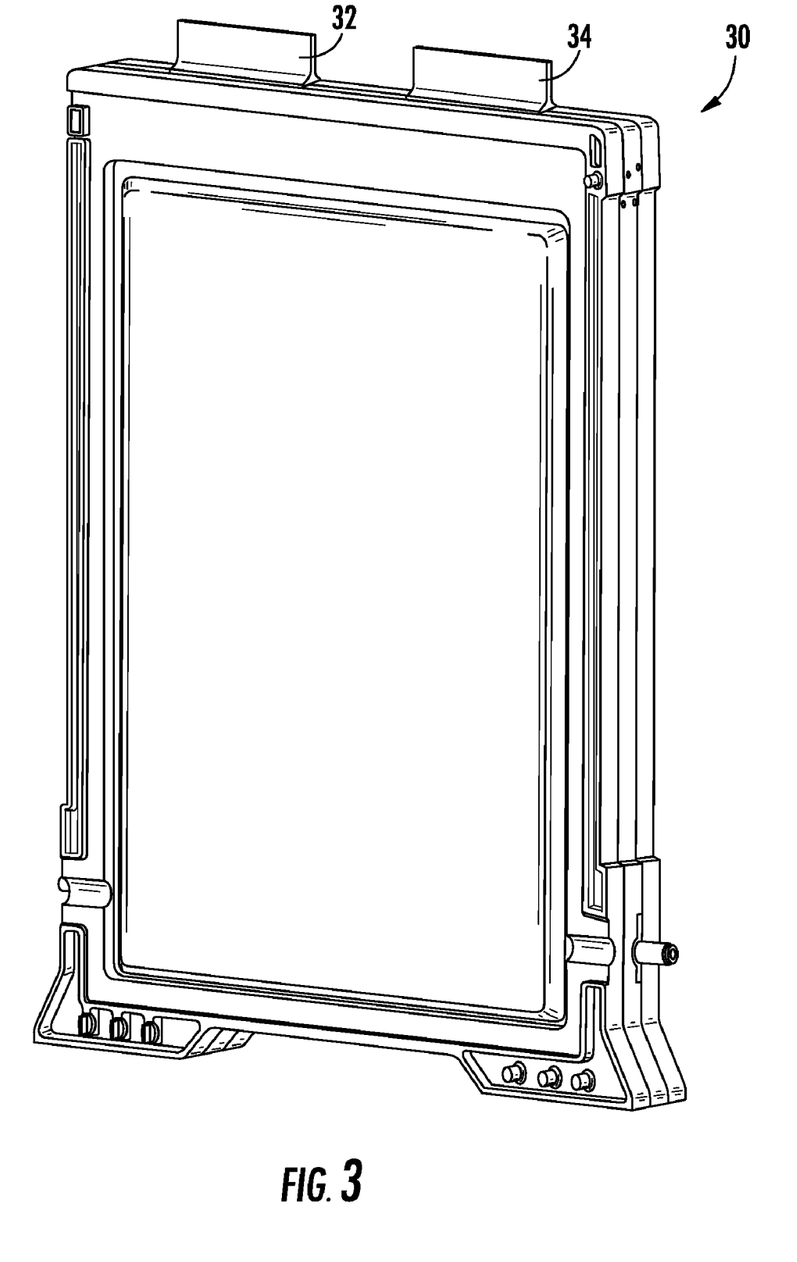
FIG. 3 is a schematic of a battery cell assembly utilized in the first battery module of FIG. 1.

Referring to FIGS. 2 and 3, the battery module 22 is configured to generate an electrical current and voltage. The battery module 22 includes a plurality of battery cell assemblies that are electrically coupled together. For example, the battery module 22 includes a battery cell assembly 30 that is illustrative of one the plurality of battery cell assemblies therein. The battery cell assembly 30 includes electrical terminals 32, 34.

The interconnect assembly 23 is configured to couple electrical terminals of the battery module 22 together. The interconnect assembly 23 is disposed on a top surface of the battery module 22.

Figure 4:
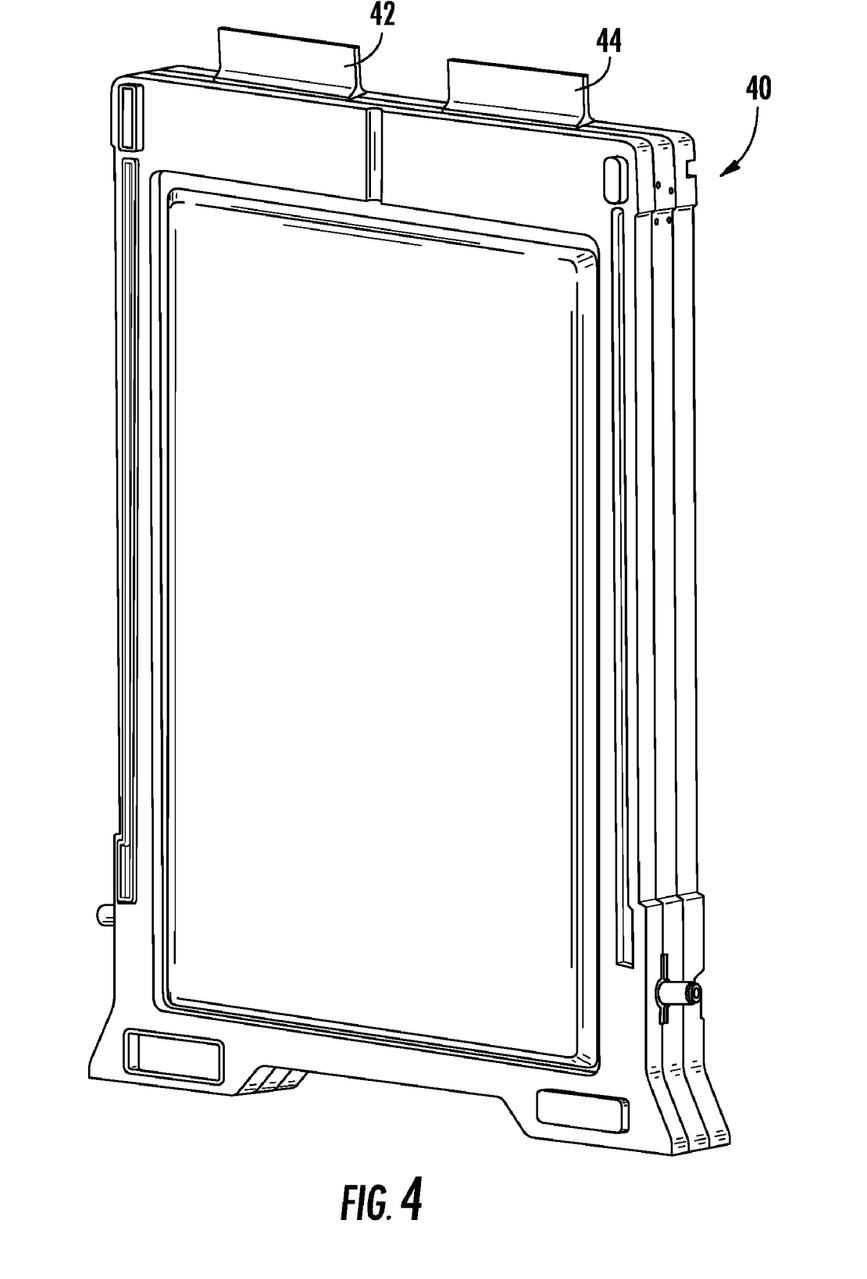
FIG. 4 is a schematic of a battery cell assembly utilized in the second battery module of FIG. 1.

Referring to FIGS. 2 and 4, the battery module 24 is configured to generate an electrical current and voltage. The battery module 24 includes a plurality of battery cell assemblies that are electrically coupled together. For example, the battery module 24 includes a battery cell assembly 40 that is illustrative of one the plurality of battery cell assemblies therein. The battery cell assembly 24 includes electrical terminals 42, 44.

The interconnect assembly 25 is configured to couple electrical terminals of the battery module 24 together. The interconnect assembly 25 is disposed on a top surface of the battery module 24.

Figure 5:
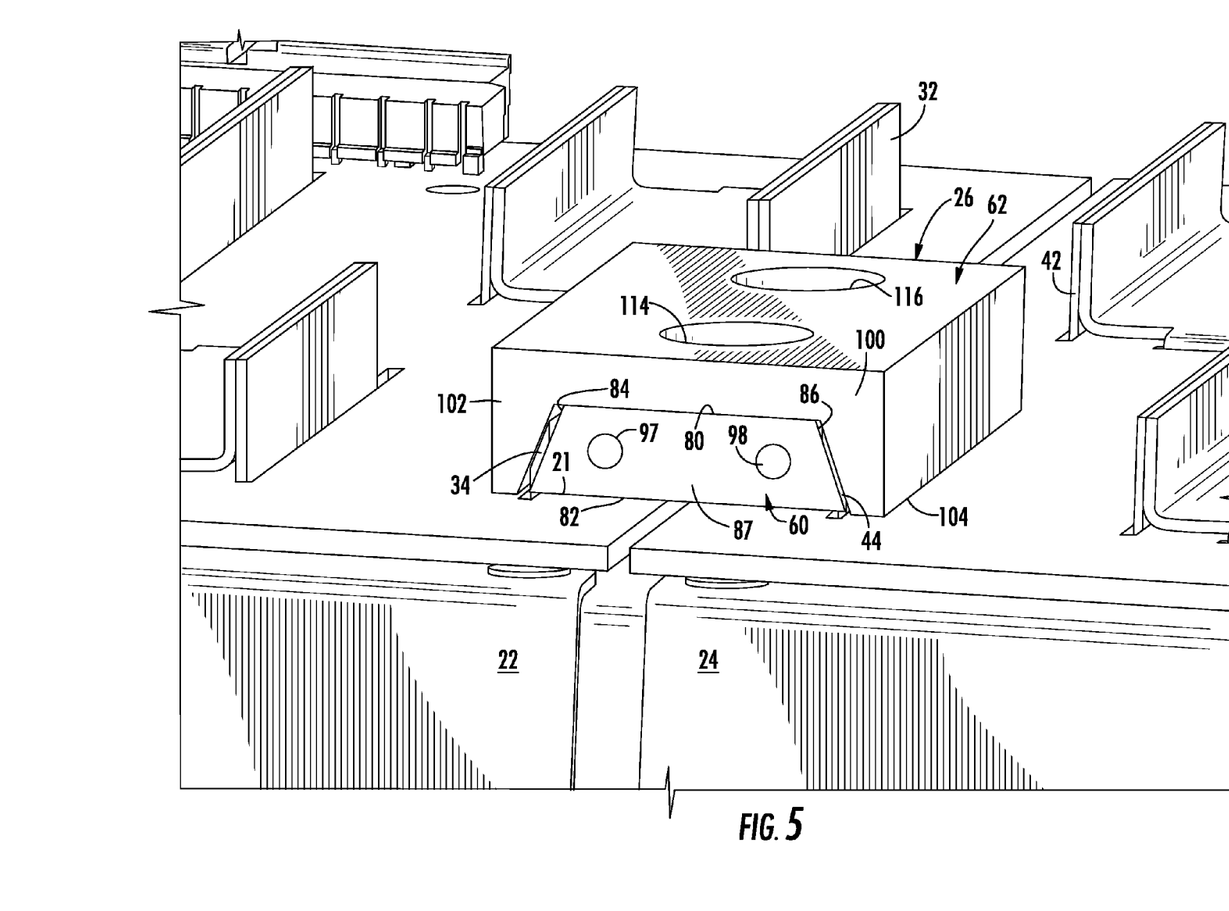
FIG. 5 is a schematic of a mechanical fastener utilized in the battery assembly of FIG. 1 in accordance with another exemplary embodiment.
Figure 6:
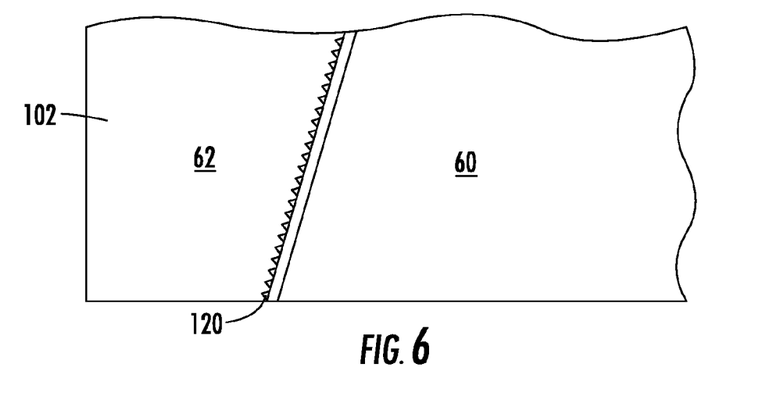
FIG. 6 is a cross-sectional schematic of a portion of the mechanical fastener of FIG. 5.
Figure 7:
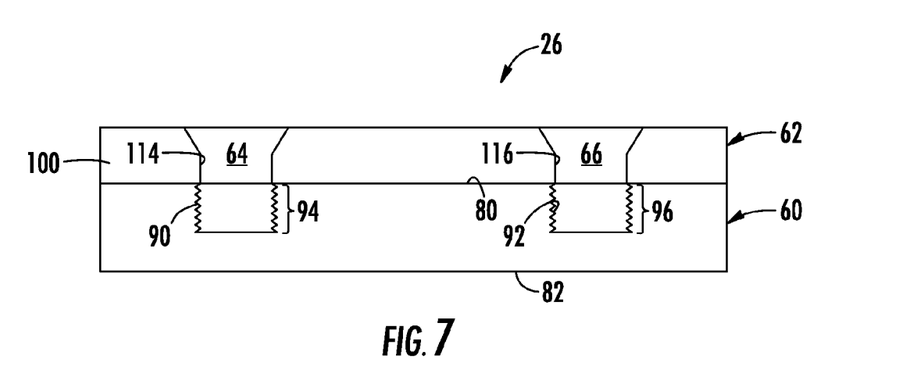
FIG. 7 is a cross-sectional schematic of another portion of the mechanical fastener of FIG. 5.
Figure 8:
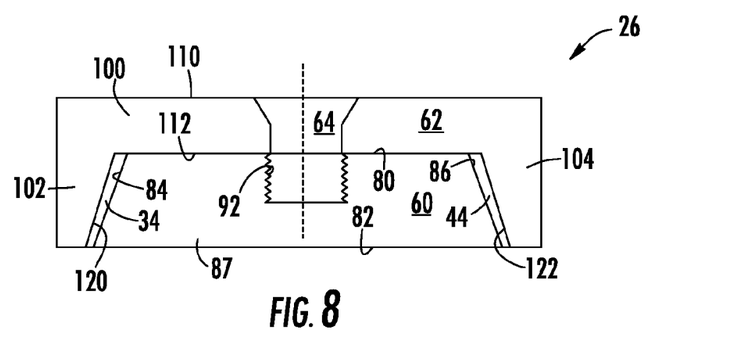
FIG. 8 is a cross-sectional schematic of another portion of the mechanical fastener of FIG. 5.

Referring to FIGS. 5, 7 and 8, the mechanical fastener 26 is provided to couple to one or more electrical terminals from the battery module 22 and to one or more electrical terminals from the battery module 24. In particular, the mechanical fastener 26 is configured to couple to the electrical terminal 34 of the battery cell assembly 30 of the battery module 22, and to the electrical terminal 44 of the battery cell assembly 40 of the battery module 24. As a result, the electrical terminals 34, 44 are electrically coupled together. The mechanical fastener 26 includes a trapezoidal-shaped plate 60, a cover portion 62, and coupling members 64, 66.

The trapezoidal-shaped plate 60 includes a top surface 80, the bottom surface 82, side surfaces 84, 86, a front surface 87, and a back surface. The top surface 80 is substantially parallel to the bottom surface 82 and is disposed away from the bottom surface 82. The front surface 87 is substantially parallel to the back surface and is disposed away from the back surface. The side surfaces 84, 86 extend between the top surface 80 and the bottom surface 82. The trapezoidal-shaped plate 60 further includes apertures 90, 92 extending from the top surface 80 into the plate 60. The apertures 90, 92 define threaded regions 94, 96 within the plate 60. The plate 60 further includes apertures 97, 98 extending from the front surface 87 into the plate 60. In one exemplary embodiment, the plate 60 is constructed from steel. Of course, the plate 60 could be constructed from other conductive materials such as copper or nickel-plated copper for example. As illustrated, the plate 60 is disposed on both the interconnect assembly 23 and the interconnect assembly 25.

Referring to FIGS. 5, 6, 7 and 8, the cover portion 62 is configured to be received over the trapezoidal-shaped plate 60. In one exemplary embodiment, the cover portion 62 is constructed from steel. Of course, the cover portion 62 could be constructed from other materials such as copper or nickel-plated copper for example. The cover portion 62 includes a plate 100 and leg portions 102, 104. The leg portions 102, 104 are disposed on opposite ends of the plate 100 and are integral with the plate 100. Further, the leg portions 102, 104 extending outwardly from the plate 100. The plate 100 includes a top surface 110 and a bottom surface 112 disposed substantially parallel to the top surface 110 and away from the top surface 110. The plate 100 includes apertures 114, 116 extending therethrough. The apertures 114, 116 are configured to align with the apertures 90, 92, respectively, of the trapezoidal-shaped plate 60 when the cover portion 62 is disposed over the plate 60. The leg portion 102 includes an angled surface 120 that is a serrated surface. The leg portion 104 includes an angled surface 122 that is a serrated surface.

Referring to FIGS. 5, 7 and 8, the coupling members 64, 66 are provided to couple the cover portion 62 to the trapezoidal-shaped plate 60. In one exemplary embodiment, the coupling members 64, 66 are bolts. However, other types of coupling members known to those skilled in the art could be utilized. When the coupling member 64 is disposed through the apertures 114, 90 of the cover portion 62 and the plate 60, respectively, and operably engages the grooved region 94, the cover portion 62 is moved toward the plate 60 such that the electrical terminals 34, 44 disposed adjacent to the side surfaces 84, 86, respectively of the plate 60 are secured between the side surfaces 84, 86, respectively, and the leg portions 102, 104, respectively. Further, when the coupling member 66 is disposed through the apertures 116, 92 of the cover portion 62 and the plate 60, respectively, and operably engages the grooved region 96, the cover portion 62 is moved toward the plate 60 such that the electrical terminals 34, 44 disposed adjacent to the side surfaces 84, 86, respectively of the plate 60 are secured between the side surfaces 84, 86 respectively and the leg portions 102, 104, respectively.

Figure 9:
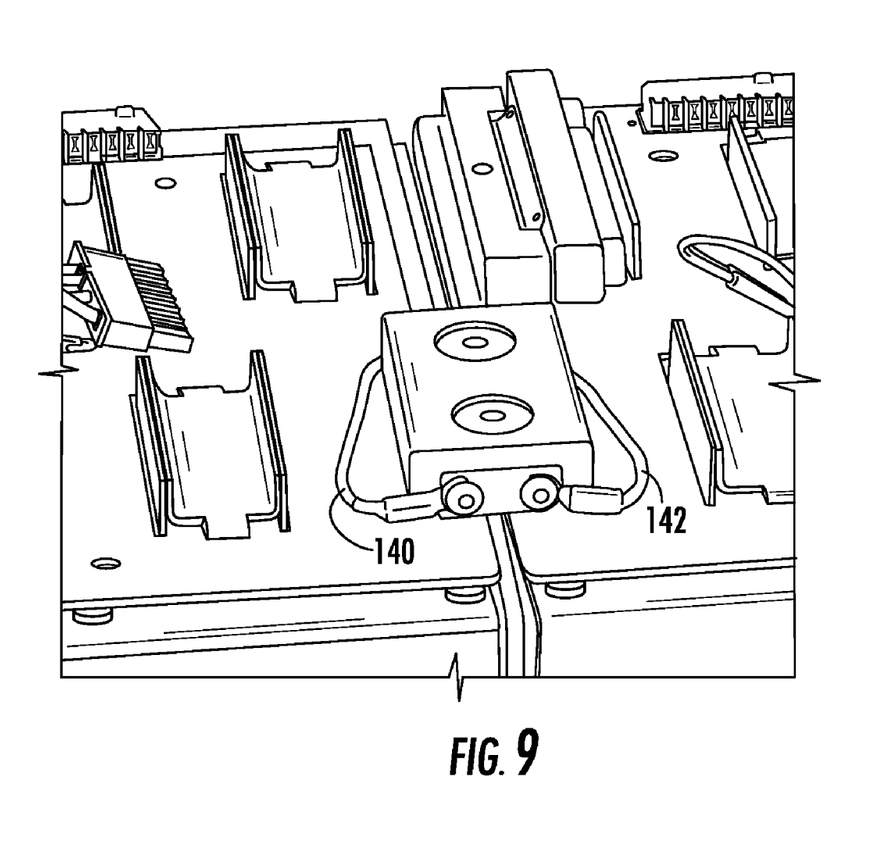
FIG. 9 is another schematic of the mechanical fastener of FIG. 5.

Referring to FIG. 9, the mechanical fastener 26 may further have voltage sense wires 140, 142 coupled to the trapezoidal-shaped plate 60. The voltage sense lines 140, 142 may be electrically coupled together on the trapezoidal-shaped plate 60 utilizing screws extending into the apertures 97, 98, respectively.

Referring to FIGS. 5, 7 and 9, a method for coupling electrical terminals from battery modules will now be explained. Initially, the trapezoidal-shaped plate 60 is disposed on the interconnect assemblies 23, 25 such that the electrical terminals 34, 44 are disposed adjacent to the side surfaces 84, 86 of the plate 60.

Next, the cover portion 62 is disposed over the trapezoidal-shaped plate 60 such that (i) the electrical terminal 34 is disposed between the leg portion 102 of the cover portion 62 and the side surface 84 of the plate 60, and (ii) the electrical terminal 44 is disposed between the leg portion 104 of the cover portion 62 and the side surface 84 of the plate 60.

Next, the coupling member 64 is disposed through the apertures 114, 90 of the cover portion 62 and the plate 60, respectively, and operably engages the threaded region 94, to move the cover portion 62 toward the plate 60 such that the electrical terminals 34, 44 disposed adjacent to the side surfaces 84, 86, respectively of the plate 60 are secured between the side surfaces 84, 86 respectively and the leg portions 102, 104, respectively, of the cover portion 60. As a result, the electrical terminals 32, 44 are electrically coupled together utilizing the mechanical fastener 26.

Next, the coupling member 66 is disposed through the apertures 116, 92 of the cover portion 62 and the plate 60, respectively, and operably engages the threaded region 96, to move the cover portion 62 toward the plate 60 such that the electrical terminals 34, 44 disposed adjacent to the side surfaces 84, 86, respectively of the plate 60 are secured between the side surfaces 84, 86 respectively and the leg portions 102, 104, respectively, of the cover portion 60. As a result, the electrical terminals 32, 44 are electrically coupled together utilizing the mechanical fastener 26.

The mechanical fastener 26 provides a substantial advantage over other fasteners. In particular, the mechanical fastener 26 provides a technical effect of utilizing a trapezoidal-shaped plate and a cover portion to couple together electrical terminals of two battery modules.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least one of the referenced items.

We claim:

1. A mechanical fastener for coupling to electrical terminals of battery modules, comprising:

a trapezoidal-shaped plate positioned on interconnect members of the battery modules, the trapezoidal-shaped plate having a top surface, a bottom surface, and first and second angled side surfaces, the first and second angled side surfaces extending between the top surface and the bottom surface, the trapezoidal-shaped plate having a first aperture extending from the top surface into the trapezoidal-shaped plate, the first aperture defining a first threaded region;

a cover portion having a first plate and first and second leg portions, the first and second leg portions being disposed on opposite ends of the first plate and integral with the first plate, the first and second leg portions extending outwardly from the first plate, the first plate having a second aperture extending therethrough, a bottom surface of the first plate being received on the top surface of the trapezoidal-shaped plate; and a first coupling member configured to extend through the first and second apertures and to engage the first threaded region to urge the cover portion toward the trapezoidal-shaped plate such that first and second electrical terminals of the battery modules disposed adjacent to the first and second angled side surfaces, respectively, of the trapezoidal-shaped plate are secured between the first and second angled side surfaces, respectively, and the first and second leg portions, respectively, of the cover portion.

2. The mechanical fastener of claim 1, wherein a first surface of the first leg portion is a serrated surface, the serrated surface configured to contact the first electrical terminal.

3. The mechanical fastener of claim 1, wherein the trapezoidal-shaped plate further has a third aperture extending from the top surface into the trapezoidal-shaped plate, the third aperture defining a second threaded region, and the first plate of the cover portion having a fourth aperture extending therethrough.

4. The mechanical fastener of claim 3, further comprising a second coupling member configured to extend through the third and fourth apertures and to engage the second threaded region to further urge the cover portion toward the trapezoidal-shaped plate.

5. A method for coupling to electrical terminals of battery modules utilizing a mechanical fastener, the mechanical fastener having a trapezoidal-shaped plate and a cover portion, the trapezoidal-shaped plate having a first aperture defining a first threaded region, the cover portion having a second aperture, the method comprising:

disposing the trapezoidal-shaped plate on interconnect members of the battery modules and adjacent first and second electrical terminals of the battery modules, such that the first and second electrical terminals are disposed on opposite angled side surfaces of the trapezoidal-shaped plate;

disposing the cover portion having a plate and first and second leg portions disposed on opposite ends of the plate over a portion of the trapezoidal-shaped plate such that the first and second electrical terminals of the battery modules are disposed between the cover portion and the opposite angled side surfaces of the trapezoidal-shaped plate; and disposing a coupling member through the first and second apertures to engage the first threaded region to move the trapezoidal-shaped plate toward the cover portion to secure the first and second electrical terminals between the trapezoidal-shaped plate and the cover portion.

\* \* \* \* \*